United States Patent
Li et al.

(10) Patent No.: US 7,190,557 B2
(45) Date of Patent: Mar. 13, 2007

(54) CURRENT-IN-THE-PLANE SPIN VALVE MAGNETORESISTIVE SENSOR WITH DUAL METAL OXIDE CAPPING LAYERS

(75) Inventors: Jinshan Li, San Jose, CA (US); Brian R. York, San Jose, CA (US); Alexander M. Zeltser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 532 days.

(21) Appl. No.: 10/824,701

(22) Filed: Apr. 14, 2004

(65) Prior Publication Data

US 2005/0231853 A1    Oct. 20, 2005

(51) Int. Cl.
*G11B 5/39* (2006.01)
(52) U.S. Cl. .................. 360/324.1; 360/324.12; 360/320
(58) Field of Classification Search ........... 360/324.1, 360/324.11, 324.12, 320
See application file for complete search history.

(56) References Cited

U.S. PATENT DOCUMENTS

| | | | |
|---|---|---|---|
| 6,178,073 B1 * | 1/2001 | Hayashi | 360/324.11 |
| 6,303,218 B1 | 10/2001 | Kamiguchi et al. | |
| 6,624,985 B1 | 9/2003 | Freitag et al. | |
| 6,709,767 B2 | 3/2004 | Lin et al. | |
| 2002/0048127 A1 * | 4/2002 | Fukuzawa et al. | 360/324.1 |
| 2002/0196589 A1 | 12/2002 | Gill | |
| 2003/0095363 A1 | 5/2003 | Horng et al. | |
| 2003/0167625 A1 | 9/2003 | Li et al. | |
| 2004/0027730 A1 | 2/2004 | Lille et al. | |

* cited by examiner

*Primary Examiner*—Craig A. Renner
(74) *Attorney, Agent, or Firm*—Thomas R. Berthold

(57) ABSTRACT

A bottom-pinned current-in-the-plane spin-valve magnetoresistive sensor has a dual metal-oxide capping layer on the top ferromagnetic free layer. The first capping layer is formed on the free layer and is one or more oxides of zinc (Zn). The second capping layer is formed on the first capping layer and is an oxide of a metal having an affinity for oxygen greater than Zn, such as one or more oxides of Ta, Al, Hf, Zr, Y, Ti, W, Si, V, Mg, Cr, Nb, Mo and Mn.

15 Claims, 3 Drawing Sheets

CURRENT-IN-THE-PLANE SPIN VALVE MAGNETORESISTIVE SENSOR WITH DUAL METAL OXIDE CAPPING LAYERS

BACKGROUND OF THE INVENTION

1. Field of the Invention

The invention relates generally to a current-in-the-plane spin-valve magnetoresistive sensor, and more particularly to such a sensor with an improved cap over the sensor free layer.

2. Description of the Related Art

One type of conventional magnetoresistive sensor, often called a "spin-valve" (SV) sensor, has a stack of layers that include two ferromagnetic layers separated by a nonmagnetic electrically-conductive spacer layer. One ferromagnetic layer has its magnetization direction fixed, typically by being pinned by exchange coupling with an adjacent antiferromagnetic layer, and the other ferromagnetic layer has its magnetization direction "free" to rotate in the presence of an external magnetic field. With a sense current applied to the sensor, the rotation of the free-layer magnetization relative to the fixed-layer magnetization is detectable as a change in electrical resistance. This is because the scattering of the electrons shared by the free and pinned layers is dependent on the orientation of their electron spin relative to the magnetization direction of the layer they penetrate.

The SV magnetoresistive sensor used in all current magnetic recording hard disk drives operates with the sense current directed parallel to the planes of the layers in the sensor layer stack, so it is referred to as a current-in-the-plane (CIP) sensor. In a disk drive CIP-SV read sensor or head, the magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance.

CIP-SV read heads are formed by successive deposition of the layers on a substrate, typically a layer of electrically insulating material that serves as the first read gap layer. When the fixed ferromagnetic layer is deposited before the free ferromagnetic layer, the head is called a "bottom-pinned" head. In a bottom-pinned CIP-SV head with the free layer on top, a cap is formed on top of the free layer before deposition of the second gap layer.

The conventional cap over the top free layer was typically a single capping layer of metal, such as Ta. More recently, nonmagnetic metal-oxides, e.g. TaOx or AlOx, have been used instead of conventional metals to cap the free layer in bottom-pinned CIP-SV read heads. Sensors with these metal-oxide single capping layers show a higher ΔR (Rmax−Rmin, where Rmax and Rmin are the sensor resistances with the magnetizations antiparallel and parallel, respectively) and a higher magnetoresisitance (ΔR/R). The nonmagnetic metal-oxide capping layers are sometimes called "specular reflection" layers because they act to confine electrons and thus increase the occurrence of spin-dependent scattering of electrons at the interface of the spacer layer and the free layer.

When a metal-oxide capping layer is used, it is often necessary to have a thin buffer layer of metal between the free layer and the capping layer to prevent oxidation of the free layer and thus degradation of the magnetoresistance of the sensor. However, because the metal buffer layer is electrically conducting, some of the sense current is shunted away from the free and pinned layers, thereby reducing the sensor magnetoresistance.

What is needed is a bottom-pinned CIP-SV magnetoresistive sensor with an improved free layer cap.

SUMMARY OF THE INVENTION

The invention is bottom-pinned CIP-SV sensor having a dual metal-oxide capping layer over the free layer. The first capping layer is formed on the free layer and is an oxide or oxides of zinc (Zn). The second capping layer is formed on the first capping layer and is an oxide of a metal having an affinity for oxygen greater than Zn, such as one or more oxides of tantalum (Ta), aluminum (Al), hafnium (Hf), zirconium (Zr), yttrium (Y), titanium (Ti), tungsten (W), silicon (Si) vanadium (V), magnesium (Mg), chromium (Cr), niobium (Nb), molybdenum (Mo) and manganese (Mn). In a preferred embodiment the first capping layer is one or more Zn oxides (ZnOx) having a thickness in the range of approximately 5 Å to 40 Å and the second capping layer is one or more Ta oxides of (TaOx) having a thickness in the range of approximately 10 Å to 80 Å.

The dual metal-oxide cap results in a sensor with higher ΔR product and higher magnetoresistance. When the free layer is formed of CoFe the improved lattice-matching between the CoFe and the ZnOx increases the crystallinity of the ZnOx which is believed to increase the free layer "live" thickness, i.e., the actual thickness that possesses a magnetic moment. Because both capping layer are oxides, there is no shunting of sense current through the cap, as occurs in sensors with a metal buffer layer as the first capping layer. Also, the dual metal-oxide cap is better than a cap with a metal buffer layer in protecting the free layer from oxidation during the subsequent anneal steps required in conventional magnetoresistive read head manufacturing.

For a fuller understanding of the nature and advantages of the present invention, reference should be made to the following detailed description taken together with the accompanying figures.

DETAILED DESCRIPTION OF THE INVENTION

Prior Art

Figure 1:
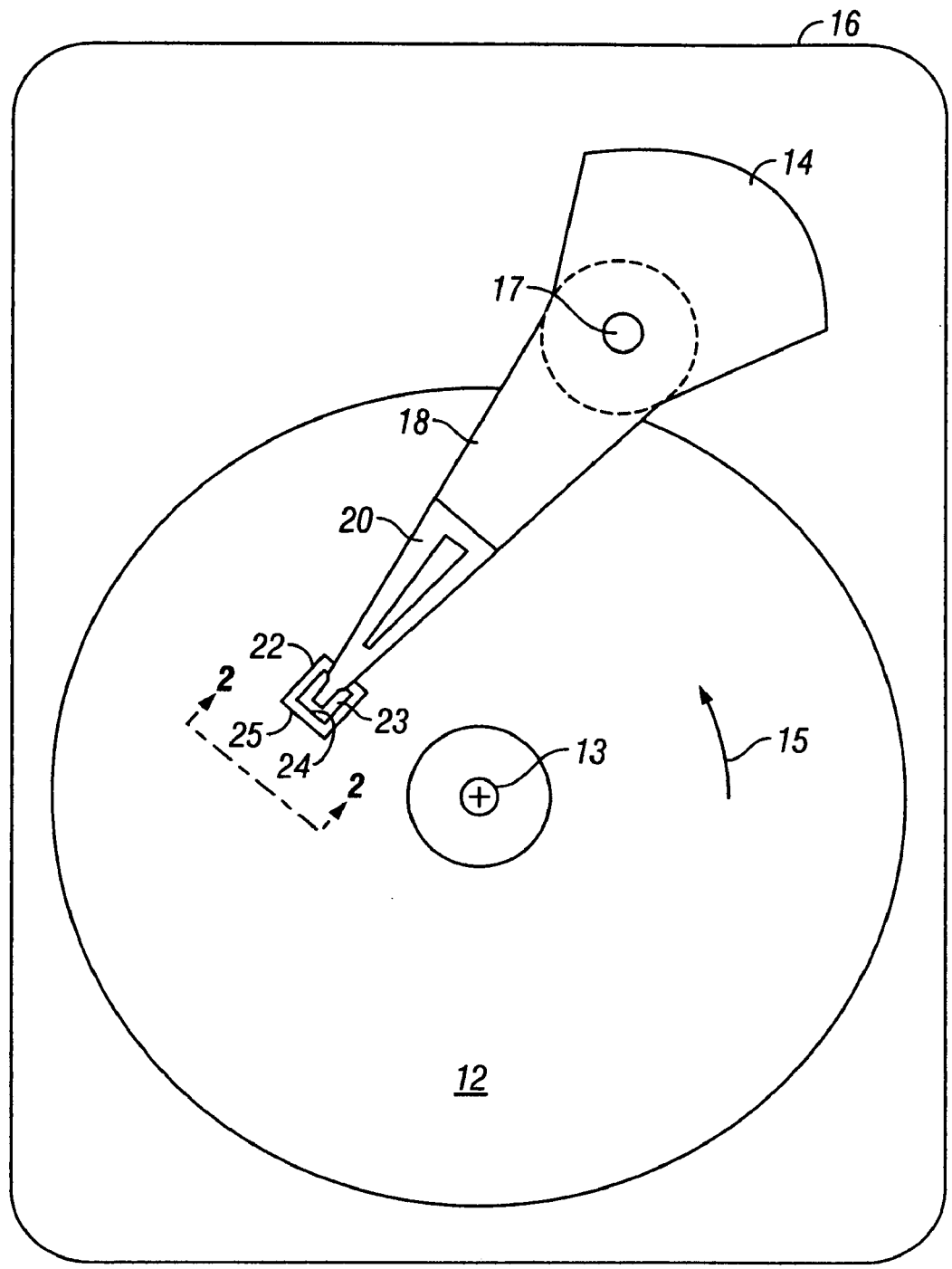
FIG. 1 is a schematic top view of a conventional magnetic recording hard disk drive with the cover removed.

FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
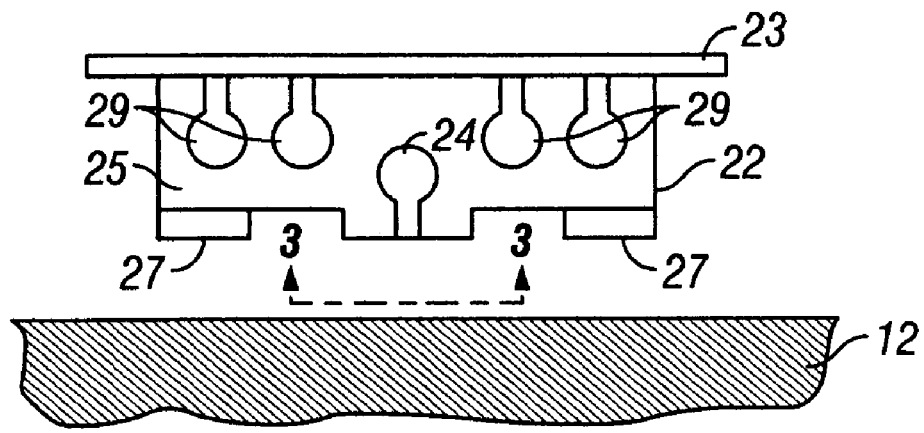
FIG. 2 is an enlarged end view of the slider and a section of the disk taken in the direction 2—2 in FIG. 1.

FIG. 2 is an enlarged end view of the slider 22 and a section of the disk 12 taken in the direction 2—2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25.

Figure 3:
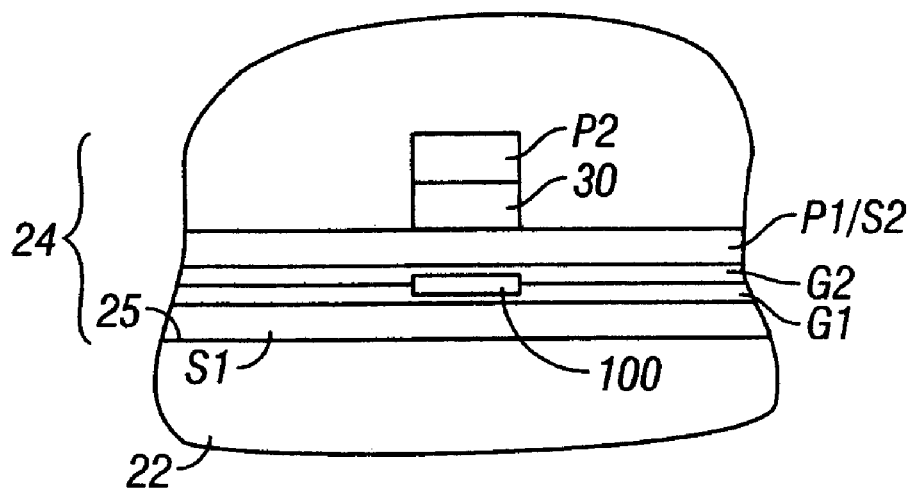
FIG. 3 is a view in the direction 3—3 of FIG. 2 and shows the ends of the read/write head as viewed from the disk.

FIG. 3 is a view in the direction 3—3 of FIG. 2 and shows the ends of read/write head 24 as viewed from the disk 12. The read/write head 24 is a series of thin films deposited and lithographically patterned on the trailing surface 25 of slider 22. The write head includes magnetic write poles P1/S2 and P1 separated by a write gap 30. The magnetoresistive sensor or read head 100 is located between two insulating gap layers G1, G2 that are typically formed of alumina. Gap layers G1, G2 are located between magnetic shields S1 and P1/S2, with P1/S2 also serving as the first write pole for the write head.

Figure 4:
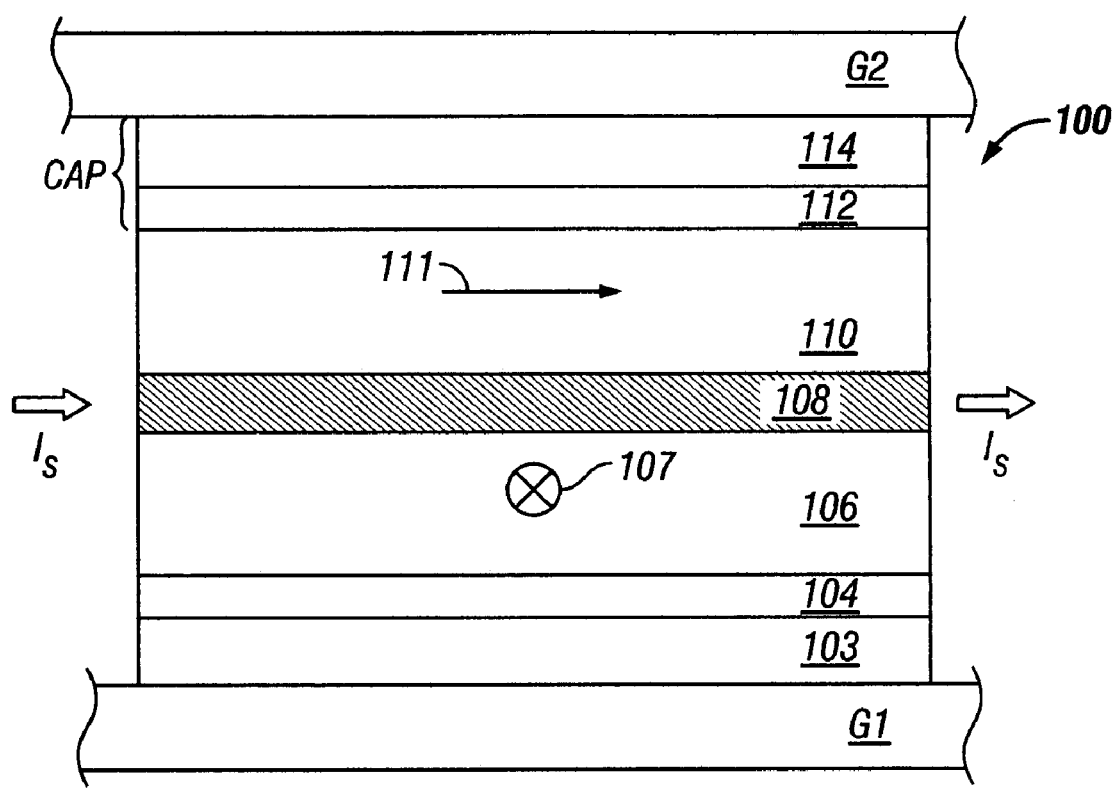
FIG. 4 is a cross-sectional view of a bottom-pinned CIP-SV read head showing a free layer cap that can be either the prior art cap or the cap used in the read head of this invention

FIG. 4 is an enlarged sectional view showing the layers making up sensor 100. Sensor 100 is a CIP-SV read head comprising a stack of layers formed between the two insulating gap layers G1, G2 that are typically an oxide such as alumina (Al2O3). The sensor layers include a pinned ferromagnetic layer 106 having a fixed or pinned magnetic moment or magnetization direction 107 oriented transversely (into the page), a free ferromagnetic layer 110 having a magnetic moment or magnetization direction 111 that can rotate in the plane of layer 110 in response to transverse external magnetic fields, and a nonmagnetic electrically-conductive spacer layer 108 between the pinned layer 106 and free layer 110. The pinned layer 106 is exchange-coupled with an antiferromagnetic layer 104 that is formed on a suitable underlayer or seed layer 103. Thus the magnetization direction 107 of pinned layer 106 is fixed and will not rotate in the presence of an external magnetic field in the range of interest, i.e., magnetic fields from recorded data on the disk 12. With a sense current $I_S$ applied generally in the planes of the free layer 110 and pinned layer 106 from electrical leads (not shown) connected at the edges of the sensor, the rotation of the free-layer magnetization 111 relative to the pinned-layer magnetization 107, due to the magnetic fields from the disk, is detectable as a change in electrical resistance.

While the pinned layer 106 is shown in FIG. 4 as a single layer it can also be the well-known antiparallel-pinned (AP-pinned) structure, also called a "laminated" pinned layer, as described in U.S. Pat. No. 5,465,185. The AP-pinned structure minimizes magnetostatic coupling of the pinned layer 106 with the free layer 110, and comprises a ferromagnetic pinned layer and a ferromagnetic reference layer separated by a non-magnetic antiferromagnetically-coupling spacer layer such as Ru, with the ferromagnetic pinned layer being exchange coupled to the antiferromagnetic layer 104. The pinned layer 106 can also be a "self-pinned" laminated structure, as described in U.S. Pat. No. 5,583,725, or a layer of relatively high-coercivity or "hard" magnetic material, such as CoPt, in which case the antiferromagnetic layer 104 is not required.

The seed layer 103 is typically one or more layers of NiFeCr, NiFe, Ta or Ru. The antiferromagnetic layer 104 is a typically a Mn alloy, e.g., PtMn, NiMn, FeMn, IrMn, PdMn, PtPdMn or RhMn. The pinned layer 106 and free layer 110 are typically formed of an alloy of one or more of Co, Fe and Ni, or a bilayer of two alloys, such as a CoFe—NiFe bilayer. The spacer layer 108 is typically formed of copper.

Sensor 100 is called a "bottom-pinned" CIP-SV read head because the pinned layer 106 is deposited before the free layer 110 and is located beneath the free layer 110. The free layer 110 is thus the top ferromagnetic layer in a bottom-pinned CIP-SV read head. A spin-valve cap, either a single capping layer or dual capping layers 112, 114, is formed on top of the free layer 110 before deposition of the insulating gap layer G2.

The conventional cap over the top free layer was typically a single capping layer of metal, such as Ta. More recently, nonmagnetic metal-oxides, e.g. TaOx or AlOx, have been used instead of conventional metals to cap the free layer in bottom-pinned CIP-SV read heads. These metal-oxide single capping layers show improved ΔR and magnetoresistance. This is attributed to improved smoothness and sharpness of the free layer/capping layer interface, which effectively increases the mean-free-path of the majority electrons due to specular reflection at the free layer/capping layer interface, and to higher electrical resistivity, which gives less current shunting than conventional metal capping layers. Because these metal-oxide capping layers act to confine electrons and thus increase the occurrence of spin-dependent scattering of electrons at the spacer layer/free layer interface they are sometimes called "specular reflection" layers.

When a metal-oxide capping layer is used, it is often necessary to have a thin buffer metal layer between the free layer and the capping layer to prevent oxidation of the free layer and thus degradation of the magnetoresistance of the sensor. Usually the metal in this buffer layer is the same metal as in the metal-oxide capping layer, such as Ta. In other examples, the capping layers 112, 114 can be Au and Al2O3, respectively, or Cu and TaOx, respectively, as described in published patent application U.S. 2002/0196589 A1. First capping layer 112 can be Au, Cu, Rh or Ru with the second capping layer 114 being an oxide of Al, Hf, Si, Y or Zr, as described in U.S. Pat. No. 6,709,767. Capping layer 112 can a metal such as Sc, Ti, Cu, Zn, Y, Zr, Ru, Rh, Pd, Ag, Cd, Re, Os, Ir, Pt, Au, Ti and Pb, and their non-magnetic alloys, as described in U.S. Pat. No. 6,303,218. Dual capping layers of Cu (or CuO) and TaOx, respectively, are described in U.S. Pat. No. 6,624,985 and dual capping layers of TaOx and alumina ($Al_2O_3$), respectively, are described in U.S. 2003/0095363 A1.

The Invention

The magnetoresistive sensor of this invention is substantially identical to the sensor previously described, with the primary exception being the first and second capping layers 112, 114.

The first capping layer is an oxide or oxides of zinc. The second capping layer is an oxide of a metal having an affinity for oxygen greater than Zn, such as one or more oxides of tantalum (Ta), aluminum (Al), hafnium (Hf), zirconium (Zr), yttrium (Y), titanium (Ti), tungsten (W), silicon (Si), vanadium (V), magnesium (Mg), chromium (Cr), niobium (Nb), molybdenum (Mo) and manganese (Mn). In a preferred embodiment the first capping layer is one or more Zn oxides (ZnOx) having a thickness in the range of approximately 5 Å to 40 Å and the second capping layer is one or more Ta oxides (TaOx) having a thickness in the range of approximately 10 Å to 80 Å.

In this invention the ZnOx first capping layer itself acts as a buffer layer between the free layer and the TaOx second capping layer, which eliminates the need for a metal buffer layer. A Zn buffer layer between the free layer and a TaOx capping layer has been shown to deteriorate specular reflection and thus reduce the sensor magnetoresistance. The deposition of ZnOx rather than Zn prior to deposition of TaOx creates a high-quality crystalline ZnOx specular reflective layer without oxidation of the free layer. It is believed that a Zn or other metal buffer layer is not required with the dual metal-oxide cap of this invention because the more stable TaOx on top of the less stable ZnOx tends to getter oxygen from the free layer, which was oxidized during the ZnOx reactive deposition. Thus oxides of metals other than Ta that have a greater affinity for oxygen than Zn, such as Al, Hf, Zr, Y, Ti, W, Si, V, Mg, Cr, Nb, Mo and Mn, may be used as the metal for the metal-oxide second capping layer.

To establish the improvement in sensor performance with the dual metal-oxide cap of this invention, bottom-pinned CIP-SV test structures with CoFe alloy free layers were fabricated with dual ZnOx/TaOx caps and with caps having a Zn buffer layer, i.e., caps with the structure Zn/ZnOx/TaOx. The metal-oxide capping layers were formed by ion-beam deposition (IBD) of the metal in the presence of oxygen (reactive IBD), but could also be formed by reactive sputtering. The predominant oxide in the ZnOx layers is believed to be stoichiometric ZnO, although other oxides are likely formed. Similarly the predominant oxide in the TaOx layers is believed to be stoichiometric $Ta_2O_5$, although other oxides are likely formed. In all of the test structures the ZnOx layers were approximately 20 Å thick and the TaOx layers were approximately 40 Å thick. Multiple test structures with the Zn buffer layer were fabricated for Zn with average thicknesses ranging from 1.2 Å to 6.2 Å.

The test structures with the dual ZnOx/TaOx caps showed significantly improved performance over the test structures with the Zn buffer layer. The test structures with the dual ZnOx/TaOx caps showed a 15% higher ΔR and a 3.5% greater ΔR/R. In addition, the improvement of the quality of the free layer/capping layer interface was evidenced by an increase of the "live" CoFe free layer thickness by approximately 2 Å for the test structures with the dual ZnOx/TaOx caps over the test structures with the Zn buffer layer. By "live" or effective thickness is meant the actual thickness of the free layer that possesses a magnetic moment, and thus excludes the surface of the free layer which may have become oxidized or mixed with adjacent layers. The increase in live free layer thickness is believed to be due to the improved lattice-matching between the ZnOx and the CoFe, which results in an increase in crystallinity of both the ZnOx and the CoFe, as shown by X-Ray diffraction.

Because both capping layers in this invention are formed of oxides, there is no shunting of sense current through the cap, as occurs in sensors with a metal buffer layer as the first capping layer. Also, the dual metal-oxide cap is better than a cap with a metal buffer layer in protecting the free layer from oxidation during the subsequent anneal steps required in conventional magnetoresistive read head manufacturing.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-in-plane (CIP) magnetoresistive sensor capable of sensing external magnetic fields, the sensor comprising:
   a substrate;
   a pinned ferromagnetic layer on the substrate and having an in-plane magnetization direction oriented in a first direction and prevented from substantial rotation in the presence of an external magnetic field;
   a nonmagnetic electrically-conductive spacer layer on the pinned layer;
   a free ferromagnetic layer on the spacer layer and having an in-plane magnetization direction oriented substantially perpendicular to said first direction in the absence of an external magnetic field, said free layer magnetization direction being substantially free to rotate in the presence of an external magnetic field;
   a first capping layer on the free layer, the first capping layer comprising one or more oxides of Zn; and
   a second capping layer on the first capping layer, the second capping layer comprising $Ta_2O_5$.

2. The sensor of claim 1 wherein the first capping layer comprises ZnO.

3. The sensor of claim 1 wherein the first capping layer has a thickness in the range of approximately 5 Å to 40 Å.

4. The sensor of claim 1 wherein the second capping layer has a thickness in the range of approximately 10 Å to 80 Å.

5. The sensor of claim 1 further comprising an antiferromagnetic layer on the substrate, the pinned ferromagnetic layer being exchange-coupled to the antiferromagnetic layer.

6. The sensor of claim 5 further comprising a seed layer on the substrate, the antiferromagnetic layer being located on the seed layer.

7. The sensor of claim 1 wherein the free layer is formed of an alloy of one or more of Co, Fe and Ni.

8. The sensor of claim 7 wherein the free layer comprises a CoFe alloy.

9. A current-in-plane spin-valve (CIP-SV) magnetoresistive read head for reading magnetically recorded data from tracks on a magnetic recording medium, the head comprising:
   a first read-head gap layer of electrically insulating material;
   a layer of antiferromagnetic material on the gap layer;
   a pinned ferromagnetic layer exchange-coupled to the antiferromagnetic layer and having an in-plane magnetization direction oriented in a first direction and prevented from substantial rotation in the presence of a magnetic field from the medium;
   a nonmagnetic electrically-conductive spacer layer on the pinned layer;
   a free ferromagnetic layer on the spacer layer and having an in-plane magnetization direction oriented substantially perpendicular to said first direction in the absence of an external magnetic field, said free layer magnetization direction being substantially free to rotate in the presence of a magnetic field from the medium;
   a first capping layer on the free layer, the first capping layer comprising one or more oxides of Zn;

a second capping layer on the first capping layer, the second capping layer comprising $Ta_2O_5$; and a second read-head gap layer of electrically insulating material on the second capping layer.

10. The head of claim 9 wherein the first capping layer comprises ZnO.

11. The head of claim 9 wherein the first capping layer consists essentially of an oxide of Zn having a thickness in the range of approximately 5 Å to 40 Å and the second capping layer consists essentially of $Ta_2O_5$ having a thickness in the range of approximately 10 Å to 80 Å.

12. The head of claim 9 further comprising a seed layer on the first read-head gap layer, the antiferromagnetic layer being located on the seed layer.

13. The head of claim 9 wherein the free layer is formed of an alloy of one or more of Co, Fe and Ni.

14. The head of claim 13 wherein the free layer comprises a CoFe alloy.

15. A magnetic recording disk drive comprising:

a rotatable magnetic recording disk;

an air-bearing slider maintained near the surface of the disk and having an air-bearing surface facing the disk surface and a trailing surface substantially perpendicular to the air-bearing surface; and the head of claim 9 located on the slider trailing surface, said in-plane magnetization direction of said pinned layer being oriented substantially perpendicular to the disk surface.

* * * * *